(12) United States Patent
Rankin

(10) Patent No.: US 6,209,492 B1
(45) Date of Patent: Apr. 3, 2001

(54) METHOD AND APPARATUS FOR A MOBILE CART FOR HERDING LIVESTOCK

(76) Inventor: Mike L. Rankin, 1380 Hardin Rd., Iowa Falls, IA (US) 50126

( * ) Notice: Subject to any disclaimer, the term of this patent is extended or adjusted under 35 U.S.C. 154(b) by 0 days.

(21) Appl. No.: 09/441,086

(22) Filed: Nov. 16, 1999

(51) Int. Cl.[7] .................................................. A01K 29/00
(52) U.S. Cl. ........................................... 119/843; 119/846
(58) Field of Search .............................. 119/14.03, 843, 119/845, 846, 848, 437, 444–446, 400, 415, 516, 518, 701; 105/143; A01K 29/00, 1/00, 15/02

(56) References Cited

U.S. PATENT DOCUMENTS

| | | | | |
|---|---|---|---|---|
| 177,009 | * | 5/1876 | Rogers | 119/843 |
| 825,970 | * | 7/1906 | Hoover | 119/701 |
| 1,794,468 | * | 3/1931 | Lynch | 105/143 |
| 2,763,240 | * | 9/1956 | Duncan | 119/14.09 |
| 3,785,349 | * | 1/1974 | Christopher | 119/846 |
| 4,763,605 | * | 8/1988 | Braum | 119/14.03 |

FOREIGN PATENT DOCUMENTS

| | | | | |
|---|---|---|---|---|
| 1395153 | * | 5/1975 | (GB) | 119/843 |
| 988247 | * | 1/1983 | (SU) | 119/843 |
| 1664216 | * | 7/1991 | (SU) | 119/843 |

* cited by examiner

*Primary Examiner*—Peter M. Poon
*Assistant Examiner*—Son T. Nguyen
(74) *Attorney, Agent, or Firm*—Zarley, McKee, Thomte, Voorhees & Sease

(57) ABSTRACT

A livestock herding cart with a chassis having forward and rearward wheel assemblies that allows movement upon a raised track. Connected to the chassis is a seat and moveable gate. The seat is positioned above the chassis and the gate extends below the chassis. The cart is used by releasing a group of livestock into a center alleyway of the raised track. The cart is then moved toward the livestock group with the gate extending substantially perpendicular to the chassis until the group exits the center alleyway. Then a second group of livestock are released into the center alleyway and the operator raises the gate and moves the cart to a position behind the second group of livestock. The operator then lowers the gate and moves towards the second group repeating the process.

2 Claims, 3 Drawing Sheets

METHOD AND APPARATUS FOR A MOBILE CART FOR HERDING LIVESTOCK

BACKGROUND OF THE INVENTION

This invention relates to an apparatus and method for herding livestock, and more particularly to a mobile livestock cart and the method of using the cart in relation to conventional livestock pens. While this invention is particularly adaptable for hog confinement buildings and the like, the terms "hogs" or "swine" as used herein are not limiting terms and are to be considered generic to other species of livestock or poultry.

Presently, when herding livestock, individuals will manually guide animals through an alleyway using a combination of panels, electric prods, and guide sticks. Some individuals even use dogs to assist in this activity.

Inherent with this process are a number of problems. First, because of the size of the alleyway, only a limited number of animals will fit into the alleyway. Therefore, after an individual guides the first group of animals from the alleyway and into the chute, to get behind the next group of animals, the individual must either exit the chute, which in many cases involves climbing over a series of gates several feet apart, or navigate back through the next group of animals in the chute one at a time. Neither method is desirable as exiting the chute is time consuming and navigating back through the chute can be dangerous resulting in bruises, scrapes or worse injuries. As a result, a need exists for a device and method that allows an individual to herd an initial group of animals through an alleyway and then move behind a subsequent group without exiting the alleyway or navigating back through a group of animals one at a time.

Therefore, a primary object of the present invention is to provide a mobile cart that assists in herding livestock.

A further object of the present invention is to provide a safe and fast way of herding, loading and unloading livestock.

Another object of the present invention is to provide a mobile livestock cart that can be operated with a minimum of difficulty in a livestock confinement building.

A still further object of the present invention is to provide a mobile livestock cart that is durable and economical to manufacture.

These and other objects will become apparent from the following description of the invention.

SUMMARY OF THE INVENTION

The livestock loading cart of the present invention includes a chassis with forward and rearward wheel assemblies that allow movement upon a raised track. Connected to the chassis is a seat and moveable gate. The seat is positioned above the chassis and the gate extends below the chassis.

The method of using the cart involves placing the cart on the tracks so that the cart spans the width of the alleyway. The next step is to release a first group of livestock from pens into a center alleyway that is formed by separate spaced parallel pens and defines the raised track. The cart, which is positioned behind the first group of livestock and with the gate extending substantially perpendicular to the chassis of the cart, is moved toward the first group forcing the group to move down the center alleyway until the group exits the center alleyway. As a second group of livestock is then released into the center alleyway, the gate on the cart is raised to a substantially horizontal position, and the cart is moved to a position behind the second group. Once in position, the gate is dropped to a substantially perpendicular position and the process is repeated by moving the cart toward the second group of livestock.

DETAILED DESCRIPTION OF THE INVENTION

Figure 1:
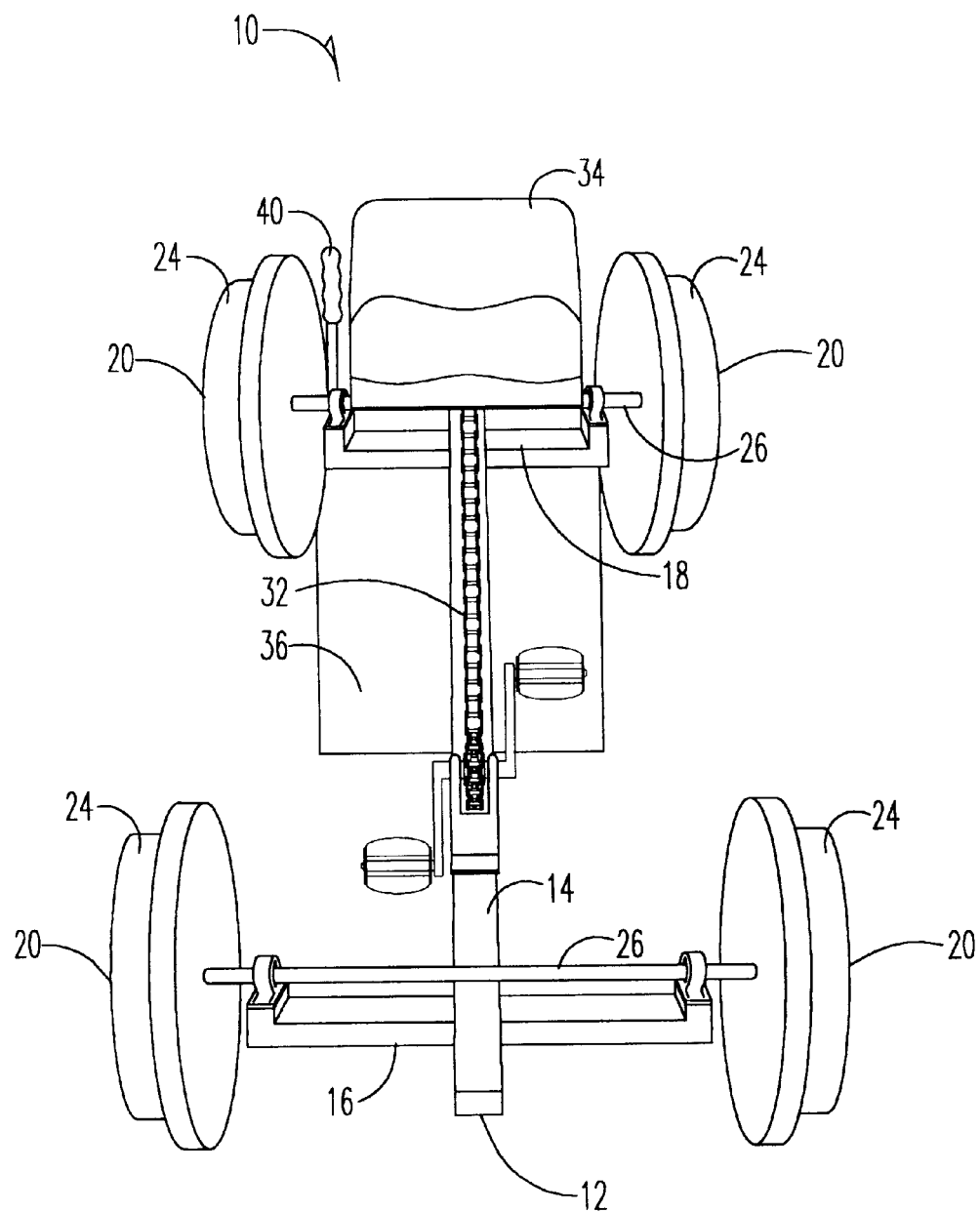
FIG. 1 is a perspective view of the cart.

Referring to the drawings, the cart of the present invention is generally referred to by reference numeral 10. The cart 10 has a chassis 12 that in one embodiment has a longitudinal member 14 transversely connected to forward and rearward members 16, 18. Connected to the forward and rearward members 16, 18 are forward and rearward wheel assemblies 20, 22 that allow for movement of the chassis 12. The wheel assemblies 20, 22, in one embodiment, have a pair of spaced apart wheels 24 attached to an axle 26 by any conventional means.

The cart 10 can be moved by the operator in a variety of ways, but in the preferred embodiment, a propelling gear 28 is connected to the longitudinal member 14 of the chassis 12. The propelling gear 28 is also connected to a drive gear 30 that is attached to the rear axle 26 by a chain 32. An operator moves the cart 10 by applying force in either a forward or rearward direction to the propelling gear 28, similar to a bicycle, which moves the chain 32 in a forward or rearward direction which in turn moves the drive gear 30 in either a forward or rearward direction. A seat 34 is connected to the chassis 12 and positioned above the chassis 12 to place the operator in a position to move the propelling gear 28 with his feet leaving the operators hands free to assist in moving the livestock.

Figure 2:
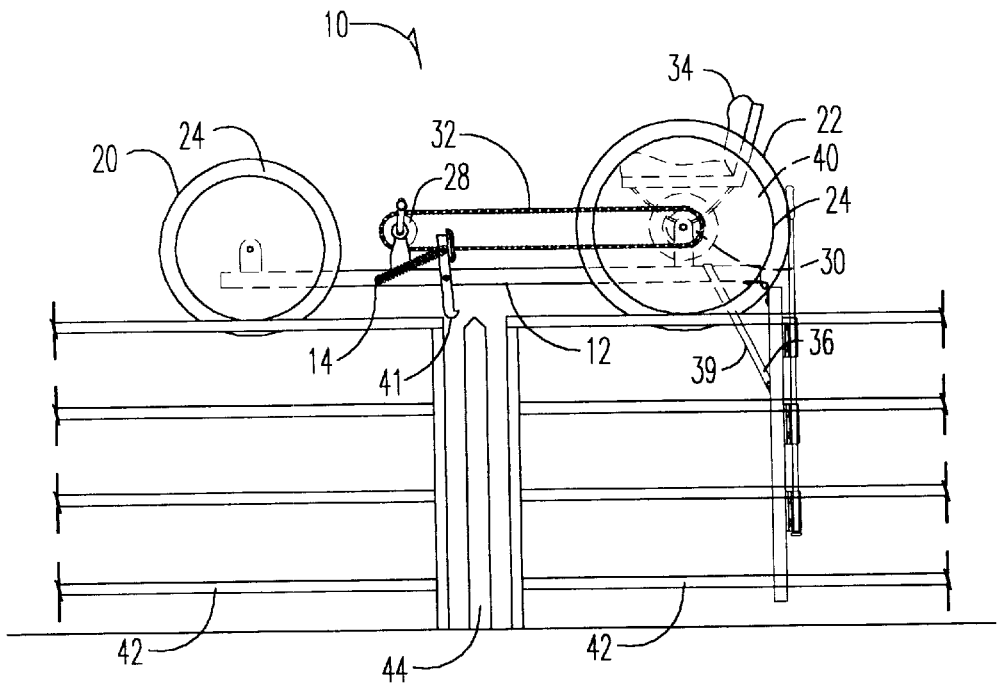
FIG. 2 is a side view of the cart with the gate extended perpendicularly.
Figure 3:
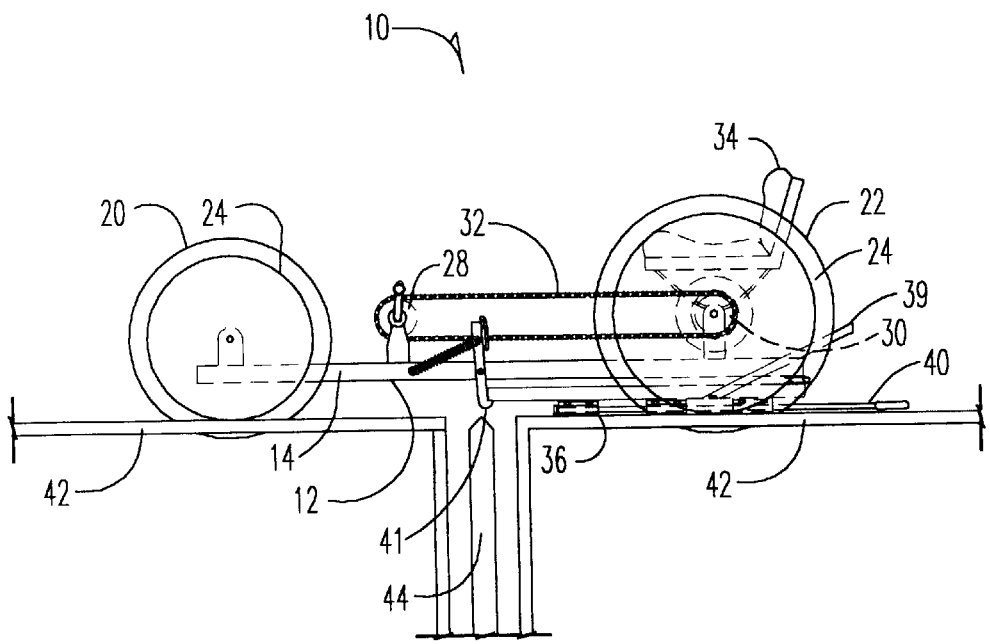
FIG. 3 is a side view of the cart with the gate extended horizontally.
Figure 4:
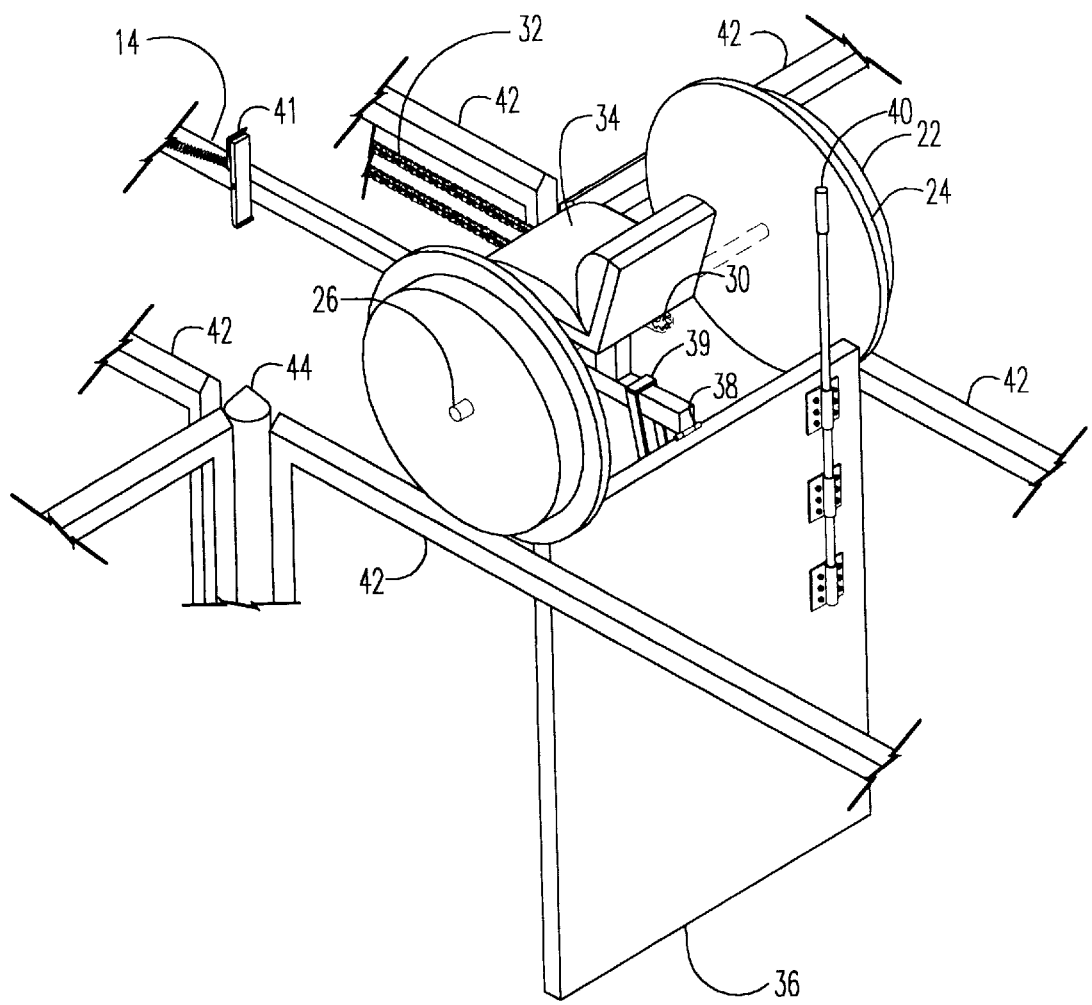
FIG. 4 is a perspective view of the cart.

A gate 36 is attached to the chassis 12 by any conventional means that allows movement of the gate 36 in relation to the chassis 12. In the preferred embodiment the gate 36 is attached to the rear end of the longitudinal member 14 of the chassis 12 by a hinge 38. The gate 36 extends below the chassis 12 and can be moved from a position generally perpendicular in relation to the chassis 12 to a position that is generally horizontal and aligned with the chassis 12. A restricting member 39 is connected to the gate 36 at one end and extends around the longitudinal member 14 at the other end. The restricting member 39 prevents the gate 36 from moving past a position substantially perpendicular to the chassis 12. A handle 40 is connected to the gate 36 and extends upwardly to assist the user in moving the gate 36 from the perpendicular position (FIG. 2) to the horizontal position (FIG. 3) while the operator is positioned in the seat 34. The gate 36 can be locked into position by any conventional means. In the preferred embodiment, a spring loaded latch 41 holds the gate 36 in its horizontal position. An operator releases the latch 41 by pulling the top portion of the latch 41 toward the seat 34.

The cart 10, which can be adapted for other uses, is generally designed for use with livestock, and in particular in hog confinement facilities. While these facilities have various arrangements, generally they consist of a plurality of pens 42 that are positioned in spaced apart relation to define a center alleyway. The pens 42 open into the center alleyway through rotation about a post 44 allowing the release of livestock for herding, loading and unloading. The top portions of the sections of the pens 42 that define the center alleyway create a raised track upon which the cart 10 sits. The gate 36, when positioned perpendicularly in relation to the chassis 12, blocks the center alleyway. The chassis 12 has an open area below that allows the operator to reach below the chassis 12 to manually assist in pushing the livestock group forward.

Generally, hog confinement pens have a six-inch gap between pens 42 where the gates 36 that open to the center alleyway hinge on the posts 44. To accommodate this gap, a wider diameter wheel 24 can cover the gap in operation and allow for a smoother ride for the operator. The diameter of wheel 24 also affects the height at which the operator sits above the alleyway and track. The width of the wheel 24 also accommodates the gap where the front portion of the pens 42 that open into the center alleyway hinge on the post 44 allowing for a smoother ride and also providing greater safety for the operator. Because the width of the alleyway can vary an inch or two, a wider wheel 24 can accommodate a greater variance in the width of the alleyway. In the preferred embodiment, the wheels 24 are six inches wide with a 19-inch diameter. The wheels 24 are made of wood or any recycled plastic and can be cast or injection molded to create the proper shape. The chassis 12 of the cart 10 is made with standard dimensional steel and aluminum tubing. The gear ratio of the propulsion gear 28 and the drive gear 30 is 1:1, when using 19-inch diameter wheels 24. This ratio gives more than enough speed and power.

In use, the cart 10 is positioned on the raised track behind a pen 42 holding a first group of livestock. Then a first group of livestock is released from a pen 42 into the center alleyway of the raised track. Next, the operator moves the cart 10 with the gate 36 extending substantially perpendicular in relation to the chassis 12 from the position behind the first livestock group toward the first livestock group. Because of the open area created by the chassis 12, the operator can manually assist using prods and other devices to move the livestock group. The operator continues to move the cart 10 toward the livestock group until the first group has exited the center alleyway. This could be into a holding pen or a loading chute. Once the first livestock group has exited the center alleyway, a second group of livestock is released from a second pen 42 into the center alleyway of the raised track. The operator then raises the gate 36 to a position substantially horizontal to the chassis 12 of the cart 10 and then moves the cart 10 to a position behind the second group livestock. The operator then drops the gate 36 to a position substantially perpendicular to the chassis 12 of the cart 10 and repeats the process of moving toward the second livestock group.

As can be seen by this disclosure, this invention provides a method and apparatus that assists in herding, loading and unloading livestock in a safe and fast way.

Several embodiments of the present invention have been set forth in the drawings and specification. Although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method for loading and unloading livestock using a cart with a chassis capable of movement upon a raised track, a seat positioned above and connected to the chassis, and a gate moveably connected to the chassis, comprising the steps of:

placing the cart on the track;

releasing a first group of livestock from a pen into a center alleyway of the raised track;

moving the cart with the gate extending substantially perpendicular from a position behind the first livestock group toward the first livestock group until the first group has exited the center alleyway;

raising the gate to a position substantially horizontal to the chassis of the cart;

releasing a second group of livestock from a pen into the center alleyway of the raised track;

moving the cart to a position behind a second group of livestock and dropping the gate to a position substantially perpendicular to the chassis of the cart; and repeating the aforementioned steps to move the second group of livestock.

2. A method of moving livestock down a narrow elongated alleyway extending between a plurality of separate spaced parallel livestock pens each having fronts and gates, comprising the steps of:

placing a mobile cart on the top of the spaced parallel livestock pens, the cart spanning the alleyway formed by the spaced livestock pens;

releasing a first group of livestock from a pen towards a first end of the alleyway;

moving the cart on the top of the pens in a first direction from a position behind the first group of livestock and projecting a first physical barrier towards the livestock from the cart to encourage the livestock to move down the alleyway in a first direction;

detaining the first groups of livestock from returning down the alleyway in an opposite direction after the livestock has moved in a first direction past a plurality of pens;

reversing the cart to a position behind a second group of livestock released into the alleyway downstream from the detained first group of livestock; and repeating the aforementioned steps to move the several groups of livestock in said first direction down the alleyway.

\* \* \* \* \*